US012511988B2

(12) United States Patent
Vandergon et al.

(10) Patent No.: US 12,511,988 B2
(45) Date of Patent: *Dec. 30, 2025

(54) LIQUID JET CUTTING HEAD SENSOR SYSTEMS AND METHODS

(71) Applicant: Hypertherm, Inc., Hanover, NH (US)

(72) Inventors: Cedar Vandergon, New Brighton, MN (US); William Schultz, Shoreview, MN (US)

(73) Assignee: Hypertherm, Inc., Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,045

(22) Filed: Jun. 18, 2024

(65) Prior Publication Data

US 2024/0339022 A1     Oct. 10, 2024

Related U.S. Application Data

(63) Continuation of application No. 17/125,819, filed on Dec. 17, 2020, now Pat. No. 12,051,316.
(Continued)

(51) Int. Cl.
    *G08B 25/00*    (2006.01)
    *B05B 12/00*    (2018.01)
(Continued)

(52) U.S. Cl.
CPC ............ *G08B 21/18* (2013.01); *B05B 12/004* (2013.01); *B26F 3/004* (2013.01); *G08B 7/06* (2013.01)

(58) Field of Classification Search
CPC ..... B05B 12/004; B05B 12/006; B05B 15/14; B05B 7/149; B05B 1/00; B05B 3/00; B05B 5/00; B05B 7/00; B05B 9/00; B05B 11/00; B05B 12/00; B05B 13/00; B05B 14/00; B05B 15/00; B05B 16/00; B05B 17/00; B24C 1/045; B24C 1/00; B24C 3/00; B24C 5/00; B24C 7/00; B24C 9/00; B24C 11/00; B25J 11/0055; B25J 13/088; B25J 9/1674; B25J 1/00; B25J 3/00; B25J 5/00; B25J 7/00; B25J 9/00; B25J 11/00; B25J 13/00; B25J 15/00; B25J 17/00; B25J 18/00; B25J 19/00; B25J 21/00; B26D 5/00;
(Continued)

(56) References Cited

U.S. PATENT DOCUMENTS

| 12,051,316 B2 * | 7/2024 | Vandergon | ............... B26D 7/22 |
| 2006/0032095 A1 * | 2/2006 | Buckner | ............... E02F 3/8816 37/304 |

(Continued)

*Primary Examiner* — Daniel Previl
(74) *Attorney, Agent, or Firm* — Perkins Coie LLP

(57) ABSTRACT

An operational monitoring system for use with a liquid jet cutting system can include an accelerometer coupled to a cutting head of the liquid jet cutting system. The accelerometer can be configured to generate motion data associated with movement of the cutting head. The system can include a computing device operably connected to the accelerometer and having a memory and a processor. The memory can store a planned data set including expected parameters associated with movement of the cutting head along a planned cut path. In some embodiments, the computing device is configured to receive the motion data from the accelerometer and correlate the motion data to the planned data set.

20 Claims, 9 Drawing Sheets

Related U.S. Application Data

(60) Provisional application No. 62/949,951, filed on Dec. 18, 2019.

(51) Int. Cl.
 *B26F 3/00* (2006.01)
 *G08B 7/06* (2006.01)
 *G08B 21/18* (2006.01)

(58) Field of Classification Search
 CPC ... B26D 7/22; B26D 7/24; B26D 1/00; B26D 3/00; B26D 7/00; B26D 9/00; B26D 11/00; B26D 2210/00; B26F 1/3806; B26F 3/004; B26F 1/00; B26F 3/00; B26F 2210/00; G05B 19/406; G05B 2219/37337; G05B 2219/37388; G05B 2219/45036; G05B 1/00; G05B 5/00; G05B 6/00; G05B 7/00; G05B 9/00; G05B 11/00; G05B 13/00; G05B 15/00; G05B 17/00; G05B 19/00; G05B 21/00; G05B 23/00; G05B 24/00; G05B 99/00; G05B 2219/00; G05B 2223/00; G08B 21/18; G08B 7/06; G08B 1/00; G08B 3/00; G08B 5/00; G08B 6/00; G08B 7/00; G08B 9/00; G08B 13/00; G08B 15/00; G08B 17/00; G08B 19/00; G08B 21/00; G08B 23/00; G08B 25/00; G08B 26/00; G08B 27/00; G08B 29/00; G08B 31/00
 USPC ............ 340/686.1, 690, 686.5, 691.1, 691.6, 340/693.4, 3.1, 3.42–3.43, 825.23, 7.32
 See application file for complete search history.

(56) References Cited

U.S. PATENT DOCUMENTS

| | | | | |
|---|---|---|---|---|
| 2018/0257253 | A1* | 9/2018 | Vandergon | B26F 3/004 |
| 2020/0047333 | A1* | 2/2020 | Wiktor | B23Q 1/54 |
| 2020/0217044 | A1* | 7/2020 | Martel | A01C 7/06 |

* cited by examiner

LIQUID JET CUTTING HEAD SENSOR SYSTEMS AND METHODS

CROSS-REFERENCE TO RELATED APPLICATIONS INCORPORATED BY REFERENCE

The present application is a continuation of U.S. patent application Ser. No. 17/125,819, filed Dec. 17, 2020, which claims priority to U.S. Provisional App. No. 62/949,951, titled PREDICTIVE LIQUID JET CUTTING HEAD OPERATION AND MAINTENANCE USING SENSORS, which was filed on Dec. 18, 2019, and is incorporated herein by reference in its entirety.

TECHNICAL FIELD

The present disclosure is generally related to systems and methods for monitoring and diagnosing performance characteristics of a liquid jet cutting system.

BACKGROUND

Current liquid jet cutting system operation and practice requires an operator to continually monitor the cutting process to detect problems such as a clogged abrasive flow, a nozzle collision with a workpiece (throwing off accuracy and/or breaking the nozzle itself), water backing up in to the abrasive line (e.g., via material warping and thus the nozzle "kissing" the material), a failed orifice, etc. Some experienced operators can detect these types of failures through changes in audible noise. However, manual monitoring of these types of visual and/or audio conditions is a tedious and time involved task for an operator/technician who could be performing other more value-added tasks. Often in the operation of these liquid jet cutting systems, operators do not have enough bandwidth to continuously monitor the operation. Considering the aforementioned issues, as well as other errors and failures associated with abrasive feed systems, the inability to quickly and automatically detect failures can result in scrapped workpieces and wasted operational time.

DETAILED DESCRIPTION

The following disclosure describes various embodiments of operational monitoring systems for liquid jet cutting systems. The operational monitoring systems can generally include one or more sensors configured to monitor characteristics (e.g., movement, sounds, temperature, etc.) of components of the liquid jet cutting system. Data generated by the sensors can be collected by a computing device (e.g., a controller). The collected data can be correlated with planned data (e.g., threshold data) associated with the cut plan of the liquid jet cutting system. In some embodiments, data collected by one sensor is correlated with data collected by another sensor. The computing device can use the correlations between the collected data and planned data, or correlations between collected data of two or more sensors, to automatically predict and detect wear, failure conditions, and/or other phenomena of interest from the components of the liquid jet cutting system. In some embodiments, the computing device is configured to automatically generate alarm signals and/or shut down all or portions of the liquid jet system when certain failures or other phenomena (e.g., resonant frequencies, leaks, etc.) are detected or predicted. Automatic alarm generation and/or shut down can reduce the risk of damage to workpieces and/or to components of the liquid jet cutting system.

In the Figures, identical reference numbers identify identical, or at least generally similar, elements. To facilitate the discussion of any particular element, the most significant digit or digits of any reference number refers to the Figure in which that element is first introduced. For example, element 240 is first introduced and discussed with reference to FIG. 2.

Figure 1:
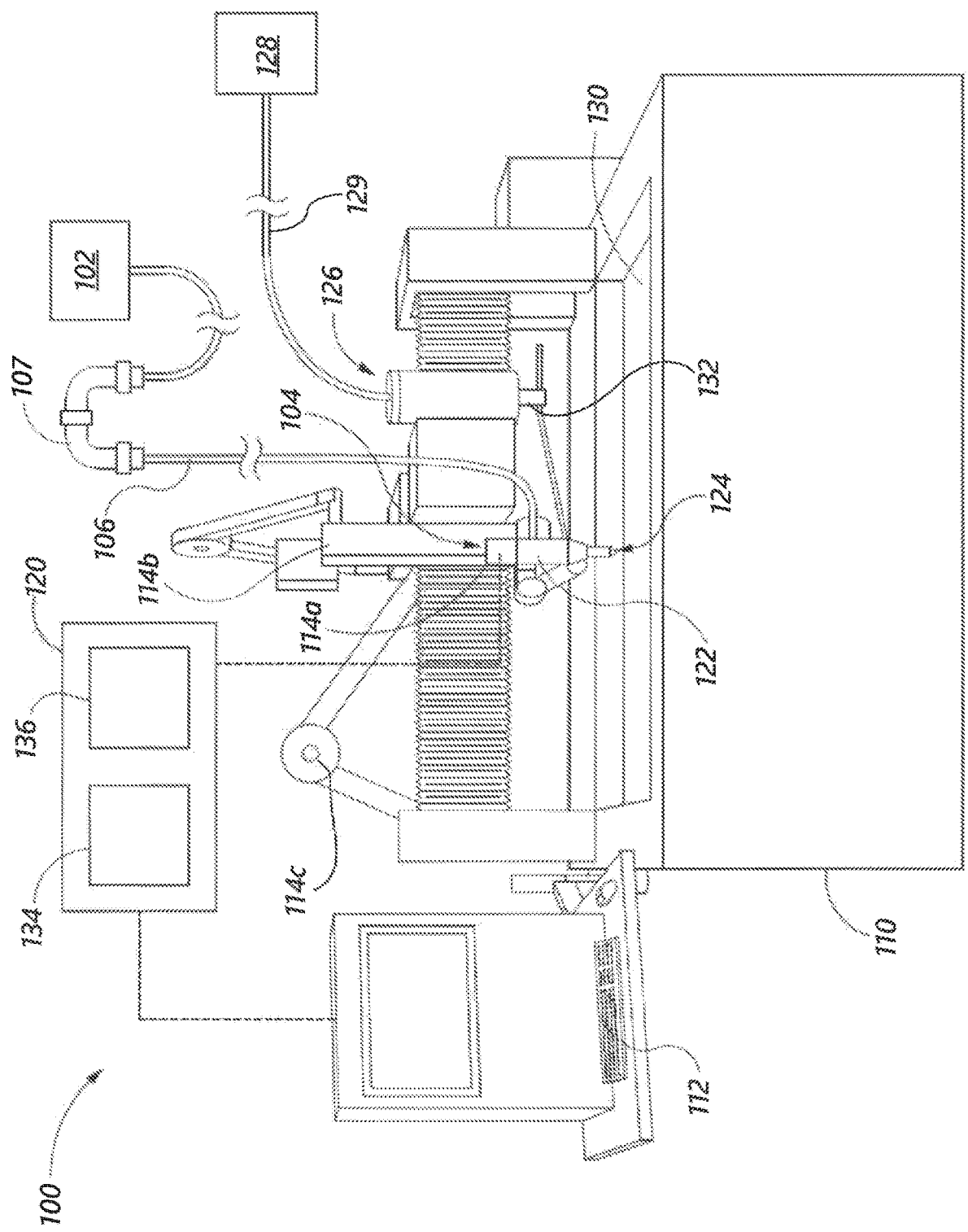
FIG. 1 is perspective and partially schematic view of a liquid jet cutting system, configured in accordance with embodiments of the present technology.

FIG. 1 is a perspective and partially schematic view of a liquid jet cutting system 100, configured in accordance with embodiments of the present technology. The system 100 can include a fluid supply assembly 102 (shown schematically). The fluid supply assembly 102 can include, for example, a fluid container, a pump, an intensifier, an accumulator, one or more valves, and/or one or more hydraulic units. The fluid supply assembly 102 can be configured to provide pressurized fluid to the system 100. In various embodiments, the system 100 uses various fluids including, e.g., water and/or gases.

The system 100 further includes a cutting head assembly 104 operably connected to the fluid supply assembly 102 and one or more conduits 106 extending between the fluid supply assembly 102 and the cutting head assembly 104. In some embodiments, the conduit 106 includes one or more joints 107 (e.g., a swivel joint or another suitable joint having two or more degrees of freedom).

The system 100 can further include a base 110 (e.g., a table) and a user interface 112. The user interface 112 can be supported by the base 110. The system 100 can include one or more actuators configured to tilt, rotate, translate, and/or otherwise move the cutting head assembly 104. For example, the system 100 can include a first actuator 114*a*, a second actuator 114*b*, and a third actuator 114*c* (collectively, "the actuators 114") configured to move the waterjet assembly 104 relative to the base 110 and other stationary components of the system 100, and/or to move the base 110 relative to the cutting head assembly, (such as a stationary waterjet assembly) 104. For example, the second actuator 114b can be configured to move the cutting head assembly 104 along a processing path (e.g., cutting path) in two or three dimensions and to tilt the cutting head assembly 104 relative to the base 110, or to tilt the base 110 relative to the cutting head assembly 104, or to tilt both. In some embodiments, the second actuator 114b tilts the cutting head assembly 104 in two or more dimensions. Thus, the cutting head assembly 104, or the base 110, or both, can be configured to direct a pressurized jet of fluid toward a workpiece (not shown) supported by the base 110 (e.g., held in a jig supported by the base 110) and to move relative to either the cutting head assembly 104 or the base 110, or both, while directing the jet toward the workpiece. In various embodiments, the system 100 can also be configured to manipulate the workpiece in translatory and/or rotatory motion, manipulating the jet and/or the workpiece.

The user interface 112 can be configured to receive input from a user and to send data based on the input to a computing device 120 (e.g., a controller). The input can include, for example, one or more specifications (e.g., coordinates, geometry or dimensions) of the processing path and/or one or more specifications (e.g., material type or thickness) of the workpiece and operating parameters (e.g., for a waterjet tool, pressure, flow rate, abrasive material, etc.).

The cutting head assembly 104 can include a cutting head 122 and a nozzle outlet 124. The cutting head 122 can be configured to receive fluid from the fluid supply assembly 102 via the conduit 106 at a pressure suitable for liquid jet (e.g., waterjet) processing. As described below with respect to FIG. 3, the cutting head 122 can include one or more components configured to condition fluid between the fluid supply assembly 102 and the nozzle outlet 124.

The system 100 can further include a consumable delivery apparatus 126 configured to feed consumables, such as particulate abrasive, from a consumables storage container 128 to the cutting head assembly 104. The system 100 can include an abrasive conduit 129 configured to convey consumables from the storage container 128 to the consumable delivery apparatus. In some embodiments, the consumable delivery apparatus 126 is configured to move with the cutting head 104 relative to the base 110, or vice versa. In other embodiments, the consumable-delivery apparatus 126 can be configured to be stationary while the cutting head assembly 104 moves relative to the base 110. The system 100 can include one or more cutting heads that can be controlled individually and can be applying same or different parameters (orifice size, mixing tube size, abrasive size, abrasive type, abrasive feed rate, etc.).

The base 110 can include a diffusing tray 130. The diffusing tray 130 can be configured to hold a pool of fluid positioned relative to the jig so as to diffuse the remaining energy of the jet from the cutting head assembly 104 after the jet passes through the workpiece.

The computing device 120 (shown schematically) can be operably connected to the user interface 112 and one or more of the actuators 114 (e.g., via one or more cables, wireless connections, etc.). In some embodiments, the computing device 120 is also operably connected to a consumable metering device 132 (shown schematically) of the consumable delivery apparatus 126. In other embodiments, the consumable delivery apparatus 126 can be without the metering device 132 or the metering device 132 can be configured for use without being operably associated with the computing device 120. The metered consumables can be but are not limited to sand, abrasive garnet, or other appropriate abrasive materials or combinations of materials.

The computing device 120 can include a processor 134 and memory 136 and can be programmed with instructions (e.g., non-transitory instructions contained on a computer-readable medium) that, when executed, control operation of the liquid jet cutting system 100.

The system can be configured to contain one or more independent or connected motion control units. The system can be configured in various ways that allow perpendicular, rotational and/or angular cutting of workpieces of different shape. Embodiments of the system can include but are not limited to gantry, bridge, multi-axis kinematics (similar in function to OMAX Tilt-A-Jet or A-Jet tools and Hypertherm Echion and HyPrecision systems), 6-axis robot, rotary, and hexapod style machines. In various embodiments, the system is suited to cutting workpieces of a wide variety of thicknesses, including workpieces of negligible thicknesses. In various embodiments, the system 100 is adapted to cut workpieces of a variety of three-dimensional shapes. In some embodiments, the jet can cut at any angle relative to the workpiece.

Figure 2:
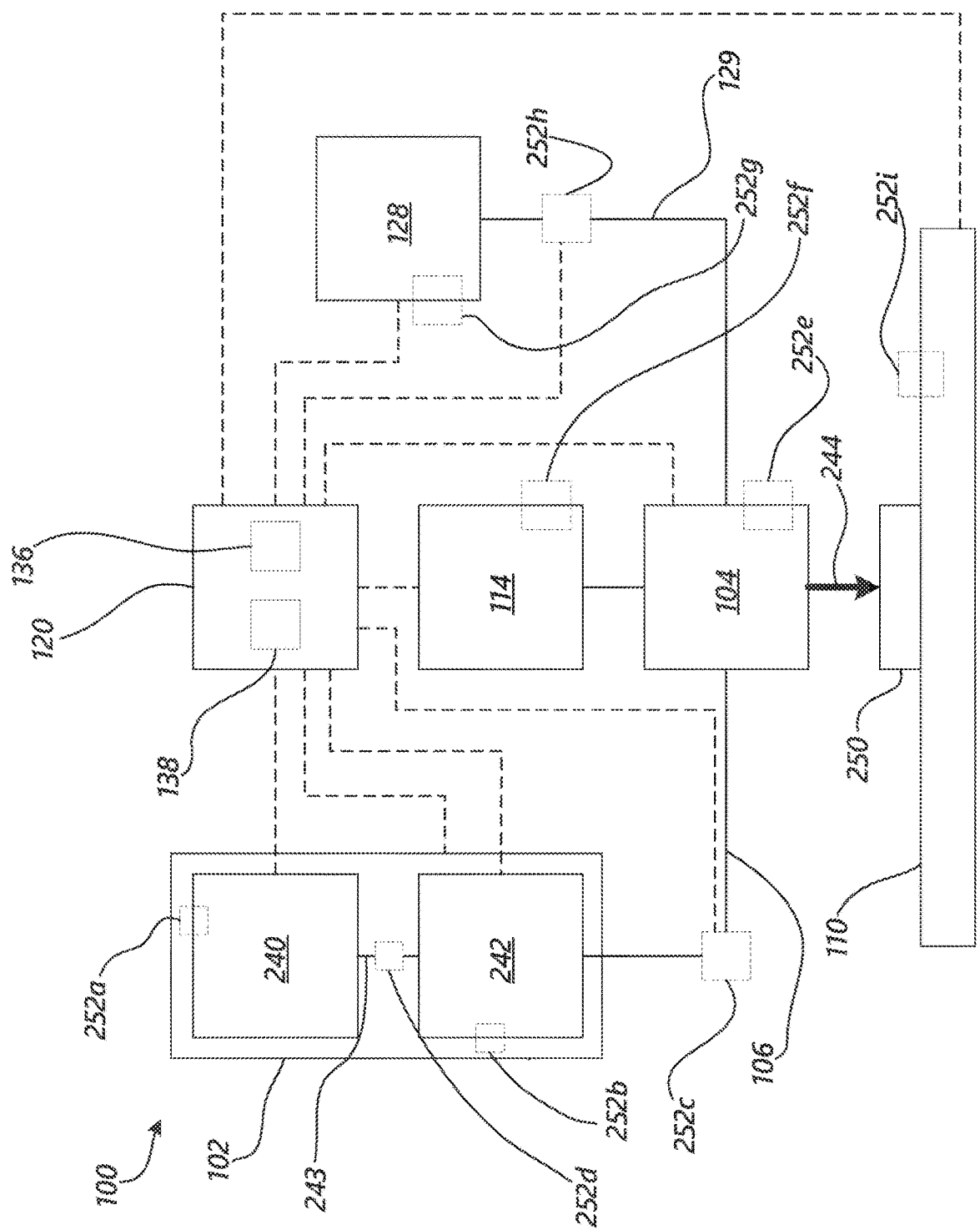
FIG. 2 is a schematic illustration of a liquid jet cutting system having one or more sensors, configured in accordance with embodiments of the present technology.

FIG. 2 is a schematic illustration of the liquid jet cutting system 100, configured in accordance with embodiments of the present technology. As explained above with respect to FIG. 1, the system 100 includes a fluid supply assembly 102 configured to provide pressurized fluid to the cutting head assembly 104 via one or more conduits 106. The fluid supply assembly 102 can include a fluid source 240, such as, for example, a fluid tank, a utility water line, or some other source of fluid. The fluid supply assembly 102 can further include one or more pressurization devices 242 in fluid communication with the fluid source 240 (e.g., via one or more fluid conduits 243), and configured to pressurize fluid from the fluid source 240. The pressurization device(s) 242 can include one or more pumps, intensifiers, accumulators, and/or other devices configured to pressurize fluid for use with the cutting head assembly 104.

The cutting head assembly 104 can be configured to receive pressurized fluid (e.g., water) from the pressurization devices 242. The cutting head assembly 104 can also receive abrasive material from the consumable storage container 128. In some embodiments, the system 100 includes one or more valves between the consumable storage container 128 and the cutting head assembly 104 to meter flow of consumable material to the cutting head assembly 104. The cutting head assembly 104 can be configured to emit a jet 244 toward a workpiece 250 to cut or otherwise remove material from the workpiece 250. The workpiece 250 can be secured to the base 110 (e.g., a table) using one or more jigs or other securement devices.

One or more of the assemblies, components, and/or subcomponents of the fluid jet cutting system 100 can include one or more sensors (collectively, "252") configured to monitor characteristics of the fluid jet cutting system 100. While FIG. 2 illustrates a single sensor corresponding to each illustrated component (e.g., a first sensor 252a corresponding to the fluid source 240, a second sensor 252b corresponding to the pressurization device(s), a third sensor 252c corresponding to the conduit 106 between the fluid supply assembly 102 and the cutting head assembly 104, etc.), one or more of the components may include more than one sensor.

The sensors 252 can be, for example, accelerometers or other motion sensors, microphones or other audio sensors, thermistors or other temperature sensors, optical sensors, pressure sensors, electrostatic sensors, continuity sensors, micro-electromechanical systems (MEMS), glass-break sensors, and/or impact switches. As described herein, accelerometers or other motion sensors can be configured to monitor orientation, scalar movement, vibration, translation, rotation, and/or tilting of a component of the liquid jet cutting system 100. In some embodiments, the fluid jet cutting system 100 includes multiple sensors 252, each of which are operably connected to or otherwise configured to monitor separate components of the fluid jet cutting system 100. In some embodiments, one or more components of the fluid jet cutting system 100 include more than one sensor configured to monitor characteristics of that single component. For example, two or more of an accelerometer, temperature sensor, audio sensor, and/or other sensor can be operably connected to and/or configured to monitor characteristics of the cutting head assembly 104 or subcomponents thereof.

The sensors 252 can be physically connected to, embedded at least partially within, or otherwise operably coupled with various components of the fluid jet cutting system 100. For example, one or more sensors 252c can be connected to the conduit 106 between the fluid supply assembly 102 and the cutting head assembly 104. The one or more sensors 252c can be positioned inside of the conduit 106, in a wall of the conduit 106, and/or on an exterior of the conduit 106. In some embodiments, a sensor 252c can be positioned near, but not directly connected to, the conduit 106 to monitor a characteristic of the conduit 106. For example, an audio sensor may be best positioned near but not in contact with the conduit 106 in order to monitor sound generated by the conduit 106 during operation of the fluid jet cutting system 100. Sensors 252 can be similarly distributed with one or more of the other components, assemblies, and subsystems of the fluid jet cutting system 100, as illustrated in FIG. 2. For example, as described below with respect to FIG. 3, one or more sensors 252e may be associated with the cutting head assembly 104. In some embodiments, one or more sensors 252 are integrated in electrical cable systems of the liquid cutting system 100. For example, one or more sensors can be integrated into cable heads or other structures of the electrical cable system.

The one or more sensors 252 can be removable attached (e.g., via magnets, clips, clamps, etc.) or fixedly attached to the components of the fluid jet cutting system 100. In some embodiments, different types of sensors are swappable with respect to the same component. For example, a first type of sensor 252 may be coupled to a component during a first operation, and then removed and replaced with a second type of sensor for a subsequent operation. In some configurations, two or more sensors 252 can share a coupling or mounting structure.

The sensors 252 can be operably connected to the computing device 120 via wired or wireless connections and can be configured to generate sensor data in response to monitoring characteristics (e.g., performance characteristics) of one or more components of the fluid jet cutting system 100. For example, one of the sensors 252 can be an accelerometer connected to a component of the liquid jet cutting system 100. The accelerometer can detect movement (i.e., vibration, rotation, translation, tilting, etc.) of the component with which the accelerometer is associated. This movement data can be collected from the accelerometer by the computing device 120 and can be stored in the memory 136 of the computing device. In some embodiments, a second sensor 252 can be used to monitor a second characteristic of a component of the fluid jet cutting system 100. The component monitored by the second sensor 252 can be the same component monitored by the first sensor 252, or another component of the fluid jet cutting system 100. The second sensor 252 can be either a same type of sensor as the first sensor 252 or a different sensor type. For example, a microphone or other audio sensor can be used in combination with an accelerometer. Audio data generated by the audio sensor can be collected by the computing device 120 and, in some embodiments, stored in the memory 136 thereof. As explained in more detail below, data generated by multiple sensors 252 can be correlated by the computing device 120 (e.g., using a processor 138 thereof) to diagnose the performance characteristic of the component being monitored.

Figure 3:
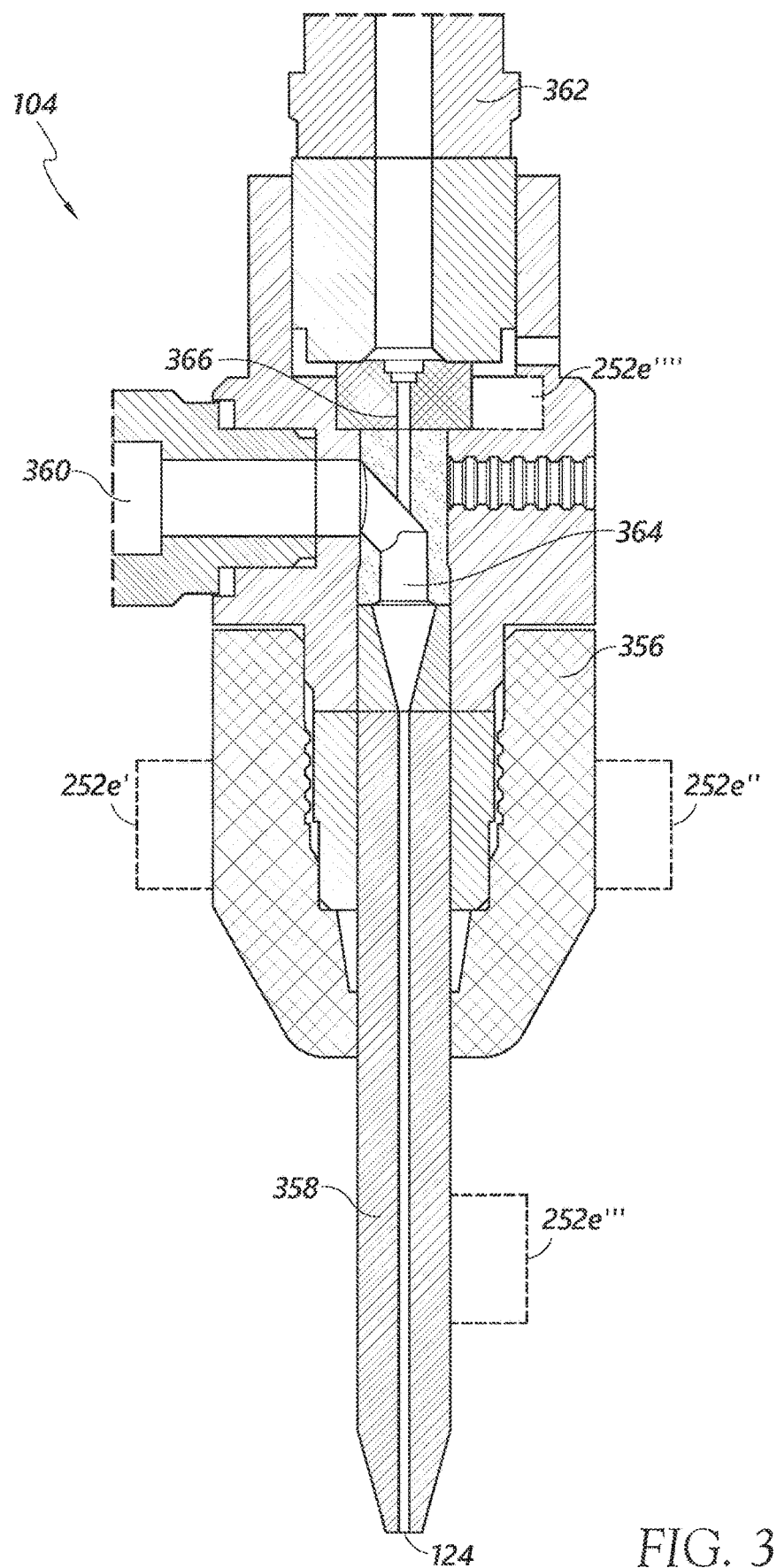
FIG. 3 is a cross-sectional view of a cutting head assembly having one or more sensors, configured in accordance with embodiments of the present technology.

FIG. 3 is a cross-sectional view of the cutting head assembly 104, configured in accordance with embodiments of the present technology. The cutting head assembly 104 can include a cutting head body 356, a nozzle 358 connected to the cutting head body 356, an abrasive inlet 360, and a fluid inlet 362. The nozzle 358 can be positioned at least partially within the cutting head body 356 and can include the nozzle outlet 124. The abrasive inlet 360 can be configured to receive abrasive material from the consumables storage container 128 (e.g., via the abrasive conduit 129). In some embodiments, the abrasive inlet 360 is in a lateral side of the cutting head body 356 with respect to a longitudinal axis of the nozzle 358. The fluid inlet 362 can be configured to receive pressurized fluid from a fluid supply assembly 102. In some embodiments, the cutting head body 356, abrasive inlet 360, and/or fluid inlet 362 include valves configured to control flow of fluid and/or abrasive material to the nozzle 358.

In some embodiments, high-pressure fluid from the fluid inlet 362 entrains abrasive material from the abrasive inlet 362 into a mixing chamber 364 within the cutting head body 356. The resulting mixed abrasive and fluid is then passed through the nozzle 358 and emitted as a high-pressure jet from the nozzle outlet 124. In some embodiments, the cutting head assembly 104 is configured to operate without abrasive material. One or more flow conditioners can be positioned within the flow paths of the fluid, abrasive, and/or mixed fluid in abrasive within the cutting head body 356. For example, the cutting assembly 104 can include an orifice 366 in the flow path between the fluid inlet 362 in the mixing chamber 364. The orifice 366 can be formed as part of the cutting head body 356 or in a separate component configured to couple with the cutting head body 356. The orifice 366 can be configured to accelerate (e.g., form a jet of) fluid upstream of the mixing chamber 364.

As illustrated in FIG. 3, one or more sensors (collectively, "sensors 252e") can be positioned on or in the cutting head assembly 104. The sensors 252e can be configured to monitor various performance characteristics of the cutting head assembly 104 and/or subcomponents thereof. For example, a first sensor 252e' can be connected to the cutting head body 356 (e.g., via a magnetic, adhesive, or other mounting structure). The first sensor 252e' can be, for example, an accelerometer configured to monitor movement of the cutting head body 356. A second sensor 252e" may also be connected to the cutting head body 356. The second sensor 252e" can be, for example, a microphone or other audio sensor configured to monitor noise generated by the cutting head assembly 104 or some subcomponent thereof. Data from each of the sensors 252e can be relayed to the computing device 120 as described above.

In some embodiments, additional sensors can be associated with the cutting head assembly 104. For example, a third sensor 252e''' can be connected to the nozzle 358 to monitor performance characteristics thereof. The third sensor 252e'''' could be an accelerometer, a microphone, a temperature sensor, or some other sensor configured to monitor a performance characteristic of the nozzle 358. In some embodiments, the third sensor 252e''' is an impact sensor configured to detect contact between the nozzle 358 and a workpiece 150. For example, in order to calibrate a distance between the nozzle 358 and the workpiece 150, the actuators 114 can bring the nozzle 358 into contact with the workpiece 150 (e.g., tapping the workpiece 150 with the nozzle 358). Determining the precise location of the nozzle 358 with respect to the workpiece 150 can reduce the likelihood of inadvertent impact between the nozzle 358 and the workpiece 150 during operation of liquid jet cutting system 100.

The cutting head assembly 104 can include one or more sensors installed inside of, or at least partially inside of the cutting head body 356 or some other subcomponent of the cutting head assembly 104. For example, a fourth sensor 252e'''' may be positioned within the cutting head body 356 at or near the orifice 366 to monitor performance characteristics of the orifice 366. In some embodiments, the fourth sensor 252e'''' can be mounted on a circuit board within the cutting head body 356. It will be understood that the cutting assembly 104 of the liquid jet cutting system 100 can include one or more, or none, of the above described sensors 252e.

Figure 4A:
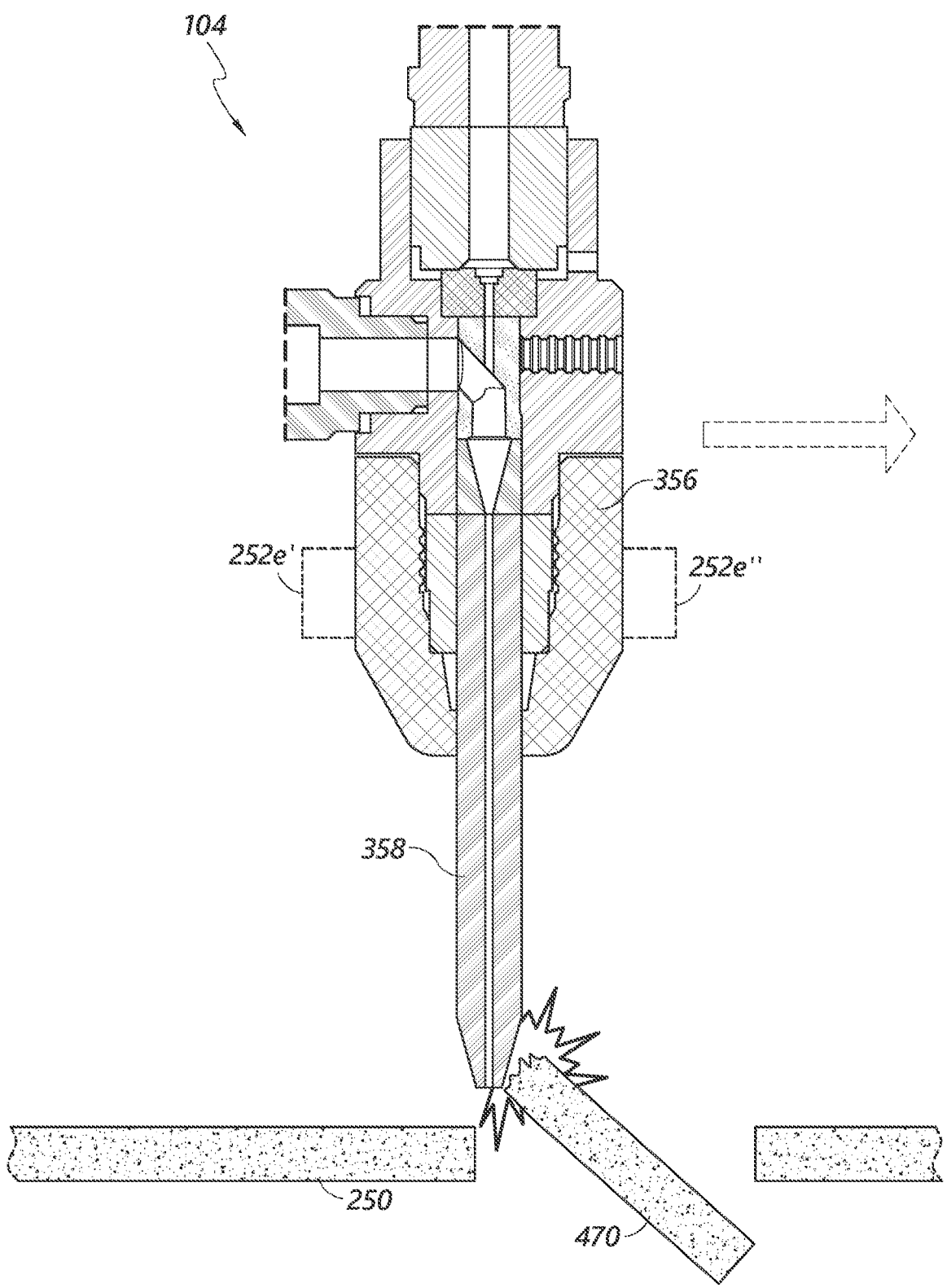
FIG. 4A is a cross-sectional view of the cutting head assembly of FIG. 3 impacting the portion of a workpiece.
Figure 4B:
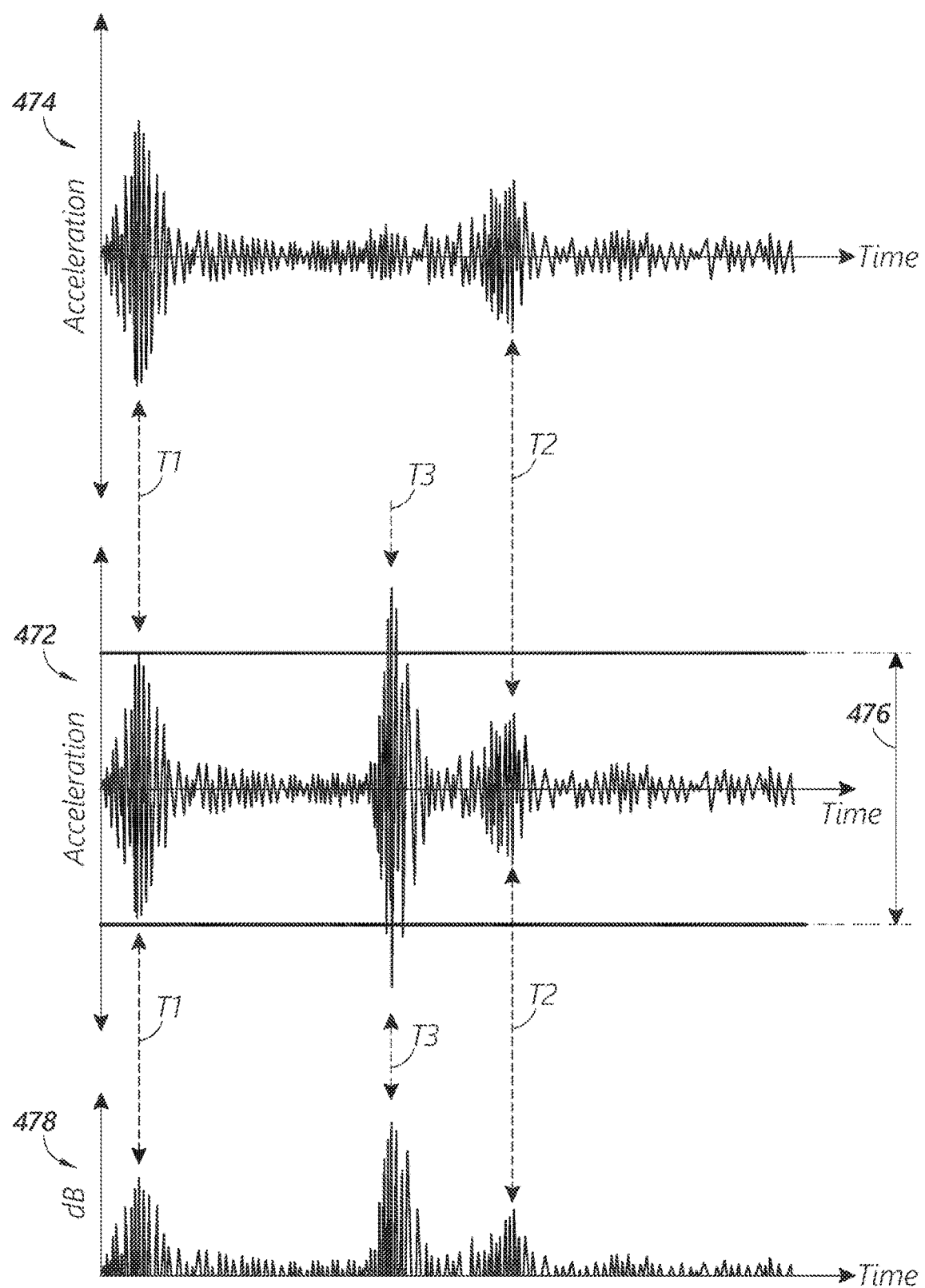
FIG. 4B illustrates data associated with detected motion, planned motion, and noise associated with the cutting head assembly of FIG. 4A.

FIGS. 4A and 4B illustrate a scenario in which sensors can be used to diagnose a failure in the liquid jet cutting system 100. Referring to FIG. 4A, in some cutting operations, once a part 470 is fully cut out of the workpiece 250, that part 470 can tip up between slats on the base 110 (e.g., table), leaving a raised obstacle in the movement path of the nozzle 358 or other component of the cutting head assembly 104. Alternatively, a portion of the workpiece 250 can break, warp, or otherwise displace into the movement path of the nozzle 358 or other component of the cutting head assembly 104. In the illustrated example, a tipped-up part 470 of the workpiece 250 is angled up toward the cutting head assembly 104 and blocks movement of the nozzle 358 as the cutting head assembly 104 moves along a cut path. The nozzle 358 can impact the tipped-up part 470 of the workpiece 250. This impact could have various negative effects on the liquid jet cutting system 100. For example, if the cutting head assembly 104 were to continue along the cut path, the nozzle 358, cutting head body 356, or some other portion of the liquid jet cutting assembly 100 (e.g., an actuator 114) could be damaged. To avoid such damage, it is desirable that the cutting head assembly 104 stop moving and/or stop cutting upon impact with the tipped-up part 470 of the workpiece 250.

FIG. 4B illustrates example data that may be monitored and collected by the sensors 252e of FIG. 4A. For example, the first sensor 252e' can be an accelerometer or other motion sensor. Movement data collected by the first sensor 252e' can be plotted as acceleration over time, as reflected in the data set charted in the movement chart 472.

The computing device 120 can be configured to correlate the movement data collected from the first sensor 252e' with planned data associated with the dictated cut path associated with the specific project and/or with normal operation of the liquid jet cutting system 100. For example, sensors 252e can be used in supervised jobs to generate data associated with normal operation of the liquid jet cutting system 100. Using the sensors 252e during supervised operation of the liquid jet cutting system 100 can generate baseline or planned data associated with performance characteristics of the liquid jet cutting system 100. The chart 474 of FIG. 4B illustrates a planned data set associated with movement of the cutting assembly 104 during normal operation. The first local maximum of the acceleration data can be at a time T1 associated with initiating a cut using the cutting head assembly 104 (e.g., starting the liquid jet). The second local maximum the acceleration data at a time T2 can be associated with shutting off the jet of the cutting assembly 104. In some embodiments, the computing device 120 can define a planned maximum acceleration 476 (chart 472) associated with normal operation of the liquid jet cutting system 100. In the illustrated example, the planned maximum acceleration 476 can be equal to or approximately equal to (e.g., within +/−5%) of the local maximum associated with initiating a cut.

Referring to the movement data reflected in the movement chart 472, a local maximum associated with impact between the nozzle 358 and the broken portion 470 of the workpiece 250 is shown at time T3. As illustrated, the magnitude of the acceleration associated with impact between the nozzle 358 and the broken portion 470 of the workpiece 250 is greater than the planned maximum acceleration 476. As explained in more detail below, the computing device 120 can be configured to generate an alarm signal and/or shut off the cutting head assembly 104 upon detection of acceleration greater than the planned maximum acceleration 476.

In some embodiments, the second sensor 252e'' can be a microphone or other audio sensor configured to monitor sound produced by the cutting head assembly 104 during operation of the liquid jet cutting system 100. sound data generated by the microphone (chart 478 of FIG. 4B) can be received by the computing device 120 and correlated to the movement data collected by the first sensor 252e' and/or to the planned data. For example, the computing device 120 can further verify the occurrence of a failure by correlating local maxima of the noise data with local maxima of the movement data. I.e., in the event that a high magnitude acceleration occurs at or near the same time that a loud sound occurs, this correlation between acceleration and sound can increase confidence that a failure (e.g. impact between two parts) has occurred. Increasing the confidence that an actual failure is detected can reduce the likelihood that the liquid jet cutting assembly 100 is shut down for a non-failure. Such unnecessary shutdowns can greatly impact work rate of the liquid jet cutting system and can have an adverse impact on the quality of the cuts made by the liquid jet cutting system. It will be understood that other types of sensor data (e.g., temperature, pressure, etc.) can be observed and correlated to other sensor data collected by sensors 252e.

Figure 5A:
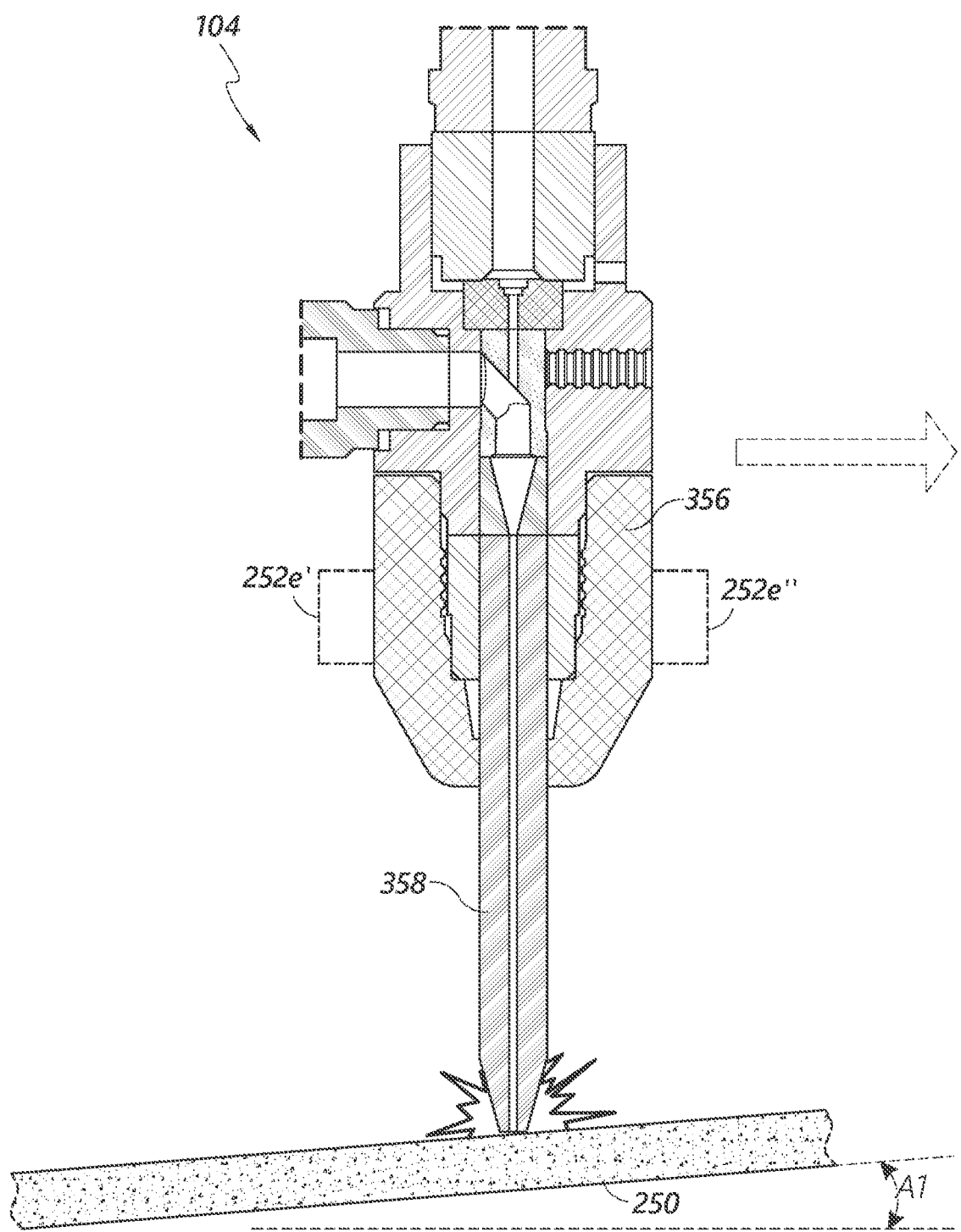
FIG. 5A is a cross-sectional view of the cutting and assembly of FIG. 3 scraping along a portion of a workpiece.
Figure 5B:
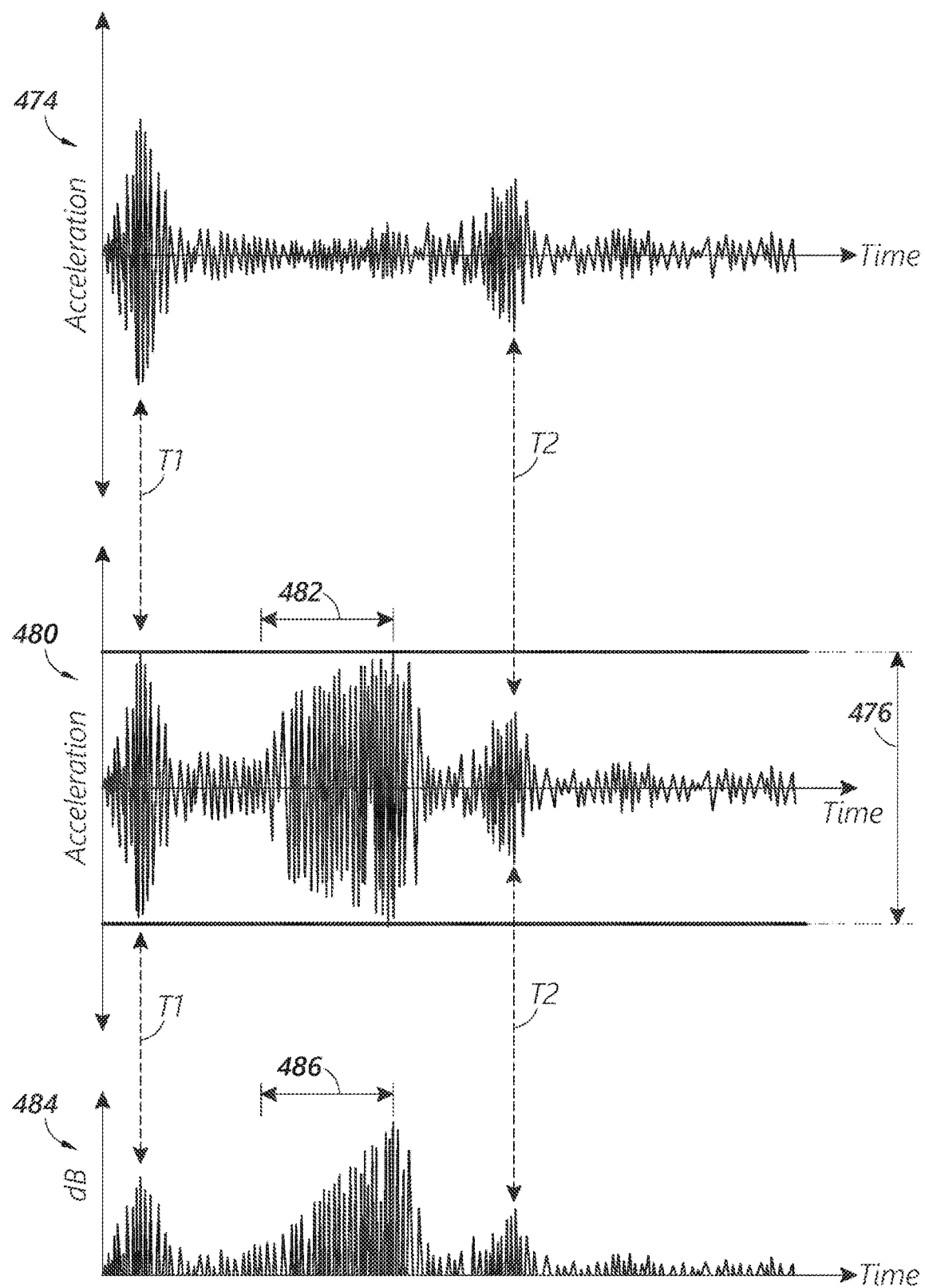
FIG. 5B illustrates data associated with detected motion, planned motion, and noise associated with the cutting head assembly of FIG. 5A.

FIGS. 5A-5B illustrate another scenario in which sensors can be used to diagnose a failure in the liquid jet cutting system 100. Referring to FIG. 5A, in some operations, the workpiece 250 can be warped, tilted, or otherwise misaligned such that the vertical position of the workpiece 250 (e.g., as measured vertically in the frame of reference of FIG. 5A and/or in a direction parallel to the longitudinal axis of the nozzle 358) is tilted upward and/or toward the cutting and assembly 104. Such tilting or misalignment may be added relatively small angle A1. For example, the angle A1 between a top surface of the workpiece 250 and horizontal may be as low as about 1°, about 5°, about 10°, and/or about 30° or less. Rather than a hard or jolting impact, contact between the nozzle 358 in such a tilted workpiece 250 can result in gradual scraping, increase friction, and/or resistance to movement of the cutting head assembly 104 along the cut path.

The scraping between the nozzle 358 and the workpiece 250 can be reflected in motion data generated by the first sensor 252' (e.g., an accelerometer). Rather than a large spike in acceleration associated with a hard impact between the nozzle 358 in the workpiece 250, the motion data may reflect a gradual increase in acceleration corresponding to scraping of the nozzle 358 along the workpiece 250. The magnitude of this increased acceleration may not, in some situations, exceed the plan max acceleration 476. In some such scenarios, the computing device 120 can correlate a range 482 of increased acceleration (e.g., as compared to the planned motion data) associated with the scraping with the plan motion data. The computing device 120 can be configured to generate an alarm signal and/or shut down the liquid jet cutting system 100 if sustained elevated acceleration is detected (e.g., elevated acceleration over an extended or predetermined period of time). For example, increased acceleration over a time range greater than 0.1 seconds, 0.3 seconds, one second, two seconds, five seconds, 10 seconds, and/or 30 seconds can be used by the computing device 120 to shut down the liquid jet cutting system 100.

In some embodiments, data from a second sensor 252e" can be used in addition to or instead of the planned data. For example, the second sensor 252e" can be a microphone configured to monitor noise output from the cutting head assembly 104. In the above-described scraping scenario of FIG. 5A, sound magnitude detected by the microphone can resemble the sound values charted in chart 484 of FIG. 5B. Specifically, the sound values may increase over a time range 486. The computing device 120, in this scenario, can correlate the time range 482 of increased acceleration detected by the accelerometer with the time range 486 of increased sound detected by the microphone. Concurrence of the ranges 482, 486 with each other can increase the confidence that a failure is occurring and reduce the risk that the computing device 120 shuts down the liquid jet cutting system 100 in reaction to a false positive detection of failure.

It will be understood that sensor data other than motion can be used to establish planned data as described above with respect to the planned maximum acceleration. For example, noise or temperature can be measured by one or more sensors during normal operation. This data can be used to established planned noise/temperature data, against which later-gathered data can be compared and correlated in a manner similar to or the same as that described above with respect to FIGS. 4A-5B.

In some embodiments, sensor data obtained at the beginning of an operation can be compared with data from the same sensor at the end of the operation to determine whether one or more components have experienced wear during the operation of the liquid jet cutting system 100. For example, accelerometer data of a first operational state (e.g., powered on without cutting or movement of the cutting head assembly 104) at a beginning of the cutting operation can be compared to accelerometer data of that same operational state at the end of the cutting operation. Some such comparisons can be made automatically by the computing device 120. For example, if higher acceleration values are observed at the end of the cutting operation, the computing device 120 can be configured to alert the user of potential wear to one or more components of liquid jet cutting assembly 100.

In addition to detecting potential failures and wear during the operation of the liquid jet cutting system 100, the sensors 252 and computing device 120 can be used to determine whether planned cuts are completed during operation of the liquid jet cutting system 100. For example, specific performance characteristics associated with the cutting head assembly 104 or subcomponent thereof indicate that the jet emitted from the nozzle 358 has pierced or otherwise cut through a workpiece 150. Such performance indicators can include, for example, a momentary spike in acceleration data from an accelerometer and/or a change in volume and/or pitch of sound produced during operation of the cutting head assembly 104. Accelerometers and/or microphones can be used during normal operation to establish baseline performance indicators indicative of piercing or cutting through workpieces. The computing device 120 can compare performance characteristics as measured by one or more sensors during a specific operation with planned or expected performance characteristics to determine whether desired piercing or through cutting is achieved. On the other hand, the computing device 120 can also determine whether an undesired piercing or through cut has occurred. In either situation, the computing device 120 can be configured to generate an alarm signal and/or shut off the jet if undesired piercing or lack of piercing occurs.

In some configuration, anomalies detected by a microphone or other audio sensor can be indicative of a clog of abrasive material a portion of the fluid jet cutting system 100. For example, abrasive material may clog in the mixing chamber 364 of the cutting and assembly 104, in the abrasive conduit 129, in the nozzle 358, or elsewhere in the liquid jet cutting system 100. Such clogs can result in increased vibration within the system 100, acceleration of fluid through the system 100, change in sound profile of the jet 244, and/or in other phenomena that would change sounds generated by one or more components of the liquid jet cutting system 100. The ON/OFF state of the consumable delivery system 126 may be monitored using an accelerometer and/or a microphone. For example, the computing device 120 can be configured to alert the user of the liquid jet cutting system 100 if the expected sound and/or vibration characteristics associated with operation of the consumable delivery system 126 are absent from the data generated by the one or more sensors of the liquid jet cutting system 100. Similarly, orifice failures (e.g. cracks or other damage to an orifice) can result in abnormal or anomalous sound emitting from one or more components of the liquid jet cutting system 100. In some embodiments, the computing device 120 is configured to alert a user of the liquid jet cutting system 100 to the possibility of a clog or other failure upon detection, by an audio sensor, of anomalous sound from the liquid jet cutting system 100 or subcomponent thereof.

In order to improve accuracy and reliability of the operational monitoring system, the computing device 120 can be configured to filter ambient noise, ambient vibration, and other environmental factors from the signals received from the one or more sensors. For example, adjacent machinery, seismic activity, altitude, humidity, and other environmental factors can affect the signals generated by the one or more sensors. These environmental factors may be filtered out of the signals by generating data using the one or more sensors while the fluid jet cutting system 100 shut off. Filtering out environmental factors can reduce the likelihood of false positive indications of failure or where in the fluid jet cutting system 100. For example, filtering out environmental factors reduces the likelihood that elevated sound levels or vibration levels from the surrounding environment are mistaken for deterioration in the performance of the fluid jet cutting system 100.

In some embodiments, the operational monitoring system is configured to filter out baseline operational characteristics of the liquid jet cutting system 100. For example, one or more sensors can be used to monitor performance characteristics of the liquid jet cutting system 100 in various states of operation. The states operation can include power on without activating the cutting head assembly 104, power on without moving components of the liquid jet cutting system 100, movement of the cutting head assembly 104 and/or other components without activating the nozzle 358 of the cutting and assembly 104, and/or other operation states. Collecting data at the various states of operation can reduce the likelihood that normal operating parameters are mistaken for failures or other anomalies.

The computing device 120 can be configured to monitor acceleration data from one or more accelerometers in the liquid jet cutting system 100 and determine whether the acceleration data indicates that one or more components are vibrating at a resonant frequency. Resonant frequency values for the one or more components may be stored in the memory 136 of the computing device 120. The computing device can be configured to generate an alarm signal and/or shut down the liquid jet cutting system 100 if resonant frequencies are detected. Such alarms and/or shut-downs can reduce the likelihood of damage to components of the liquid jet cutting system 100 due to wear imposed by vibrations at resonant frequency of those components.

In some embodiments, the planned data associated with a specific cutting operation can include orientation data of the cutting head assembly 104, nozzle 358, or the components of the liquid jet cutting system 100. One or more accelerometers or other motion sensors may be used to monitor orientation of the cutting head assembly 104 during a cutting operation in the monitored orientation data produced by such sensors can be compared to the planned data. Differences in orientation between the monitored orientation data in the planned data can indicate deviation of the cutting assembly 104 from the planned cut path. The computing device 120 can be configured to detect such deviations generate alarm signals and/or shut down the liquid jet cutting system 100 when and if such orientation deviations are detected.

Figure 6:
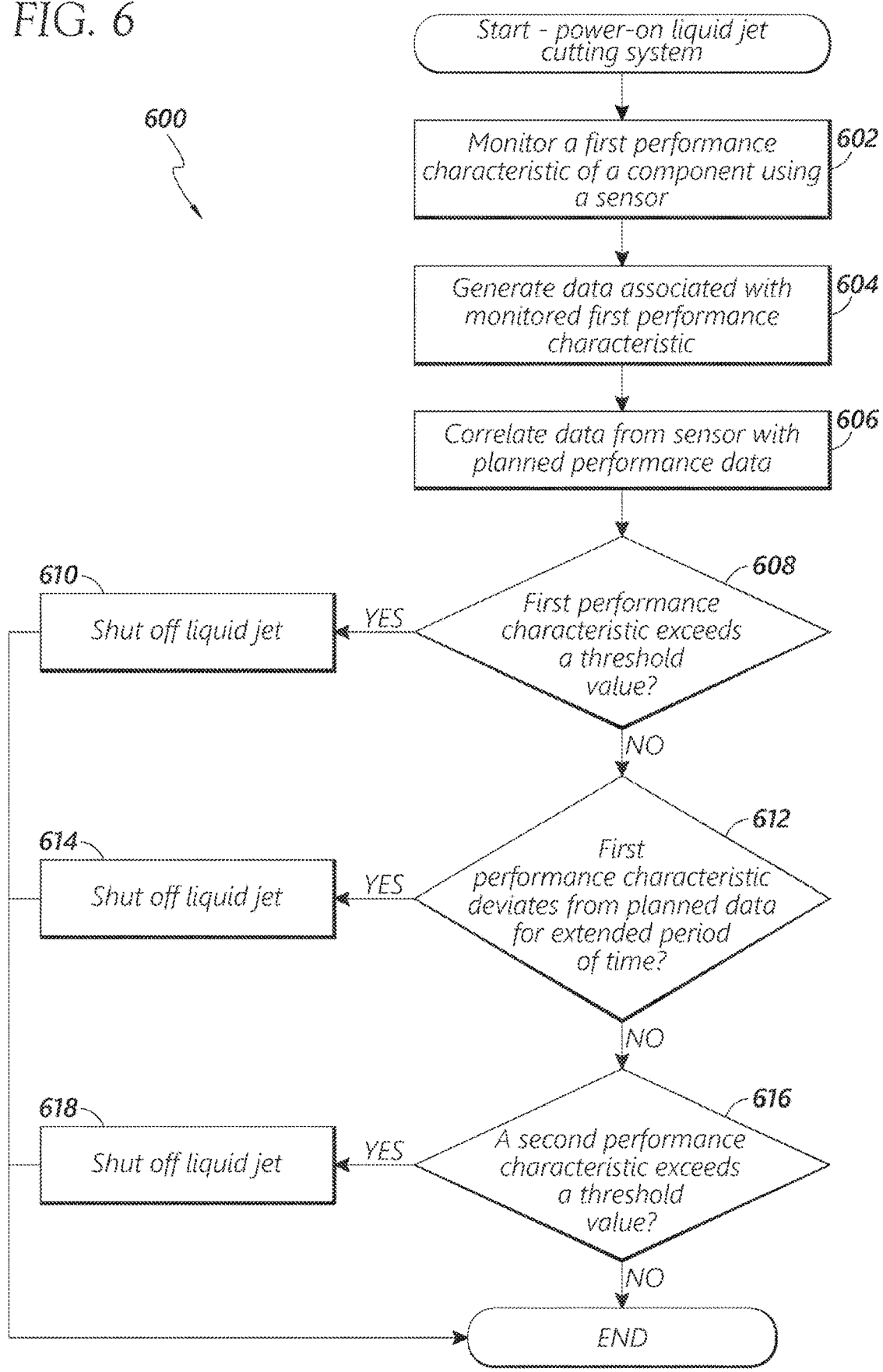
FIG. 6 is a flow diagram of a routine for monitoring operation of a liquid jet cutting system, in accordance with some embodiments of the present technology.

FIG. 6 is a flow diagram of a routine 600 for monitoring performance of the liquid jet cutting system 100 described in detail above with reference to FIGS. 1-5B, in accordance with an embodiment of the present technology. All or portions of the routine 600 can be performed by the computing device 120 in accordance with computer-readable instructions stored on, e.g., the memory 136. Although the routine 600 is described below in reference to the liquid jet cutting system 100 described above with reference to FIGS. 1-5B, it will be appreciated that the routine 600 and/or various portions thereof can be performed with other liquid jet cutting systems having configured in accordance with the present disclosure.

The routine 600 begins by powering on the liquid jet cutting system (e.g., the liquid jet cutting system 100 described above). The routine then proceeds to block 602, wherein one or more sensors are used to monitor a first performance characteristic of a component of the liquid jet cutting system. For example, as described above, an accelerometer can be used to monitor movement of the cutting head assembly of the liquid jet cutting system. The first performance characteristic can be something other than movement, such as temperature, noise, pressure, or another characteristic. In some embodiments, more than one sensor is used to monitor the first performance characteristic of a component of the liquid jet cutting system.

The routine 600 can proceed to block 604 wherein data associated with the first performance characteristic is generated by one or more sensors. In some embodiments, the data is displayed to a user. For example, the data can be displayed as a graph or chart similar to those described above with respect to FIGS. 4B and 5B. In some embodiments, the data associated with the first performance characteristic is not displayed to the user. The data can be sent to a computing device (e.g., the computing device 120 described above).

The routine 600 then proceeds to block 606, wherein the computing device correlates the data generated by the one or more sensors with planned data gathered during previous operation of the liquid jet cutting system. For example, the planned data can be data gathered during analogous operations at known, normal (e.g., without fault) operating conditions and stored in a memory of the computing device.

Correlating the first performance characteristic data with the planned data can include confirming whether the monitored first performance characteristic data exceeds or otherwise deviates from the planned data. For example, the computing device can determine whether magnitude of an acceleration monitored by an accelerometer exceeds a maximum planned acceleration associated with the present operation of the liquid jet cutting system. In some embodiments, correlating first performance characteristic data with the planned data can include determining whether monitored first performance characteristics exceeds expected planned data characteristics over a predetermined period of time.

Moving to decision block 608, the computing device can determine whether the first performance characteristic exceeds a predetermined threshold value for that performance characteristic. For example, the computing device can determine whether acceleration levels, sound levels, temperature values, pressure values, and/or other performance characteristics are greater than correlating predetermined maximum values. If the measured values exceed the threshold values, the computing device can be configured to shut off the liquid jet, as indicated in block 610.

If the measured first performance characteristic does not exceed the corresponding threshold value, the computing device can determine whether the first performance characteristic deviates from the planned data for an extended or otherwise predetermined period of time, as indicated in decision block 612. If the computing device determines that the first performance characteristic deviates from the planned data for an extended or otherwise predetermined period of time, the computing device can be configured to shut off the liquid jet, as indicated in block 614.

Finally, if the first performance characteristic does not deviate from the planned data for an extended or otherwise predetermined period of time, the routine 600 can proceed to decision block 616, wherein the computing device determines whether a second performance characteristic exceeds a threshold value. The second performance characteristic can be different from the first performance characteristic. For example, if the first performance characteristic is the movement of a component of the liquid jet cutting system, the second performance characteristic could be sound levels, pressure levels, and/or temperature of that component. In some embodiments, the second performance characteristic is of the same type as the first performance characteristic, but measured at a different location or with respect to a different component of the liquid jet cutting system. The computing device determines that the second performance characteristic exceeds a threshold value, the computing device can be configured to shut off the liquid jet system, as indicated in block 618.

In some embodiments, before shutting off the liquid jet, the computing device is configured to generate an alarm. The alarm can be an audible alarm, a visual alarm, or some other alarm used to alert a user of the liquid jet cutting system to the likelihood of a failure in the liquid jet cutting system. In some such routines, the user can be given a predetermined amount of time in which to decide whether to shut off the liquid jet cutting system or allow operation to continue.

Figure 7:
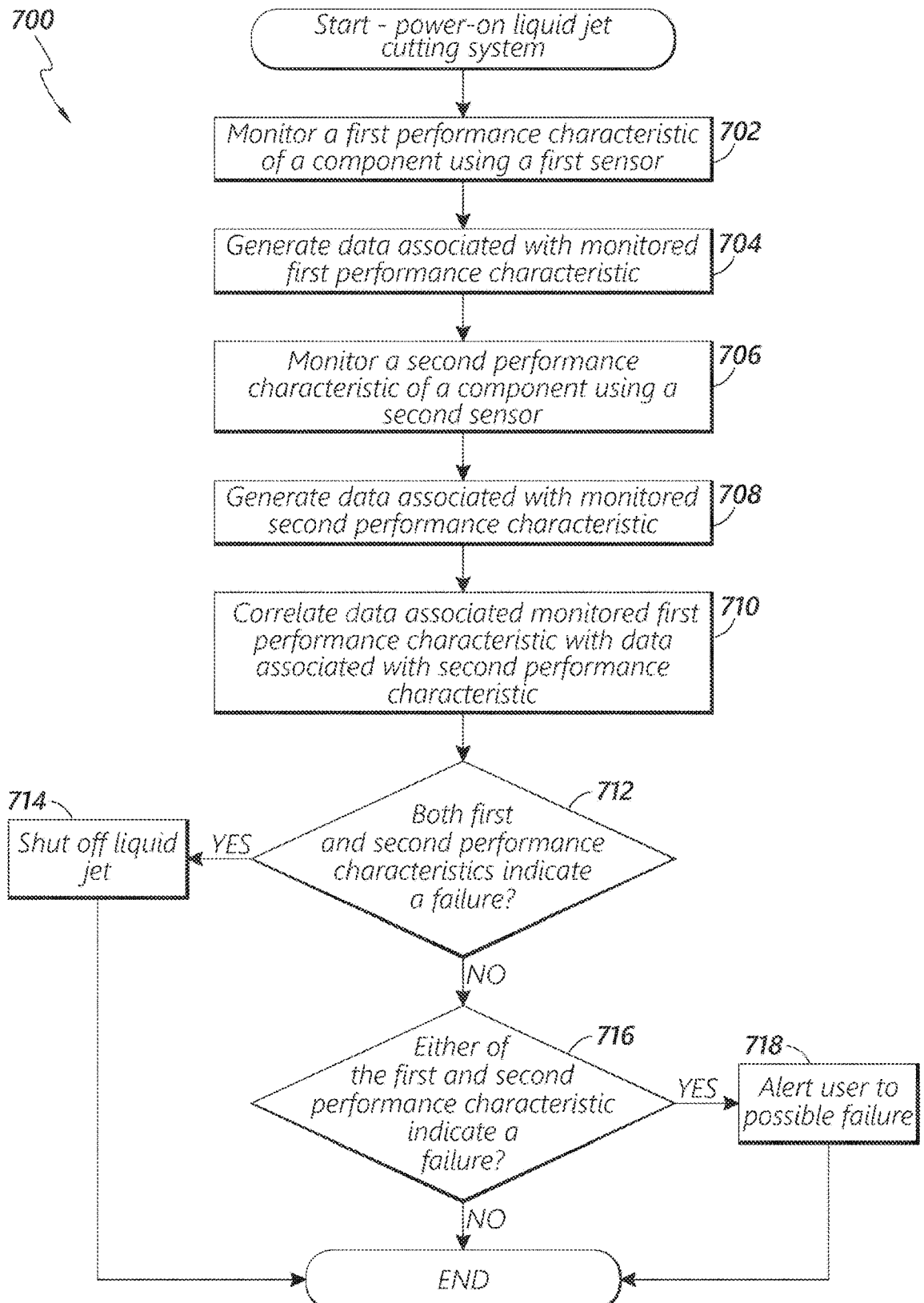
FIG. 7 is a flow diagram of another routine for monitoring operation of a liquid jet cutting system, in accordance with some embodiments of the present technology.

FIG. 7 is a flow diagram of a routine 700 for monitoring performance of the liquid jet cutting system 100 described in detail above with reference to FIGS. 1-5B, in accordance with an embodiment of the present technology. All or portions of the routine 700 can be performed by the computing device 120 in accordance with computer-readable instructions stored on, e.g., the memory 136. Although the routine 700 is described below in reference to the liquid jet cutting system 100 described above with reference to FIGS. 1-5B, it will be appreciated that the routine 700 and/or various portions thereof can be performed with other liquid jet cutting systems having configured in accordance with the present disclosure.

The routine 700 begins by powering on the liquid jet cutting system (e.g., the liquid jet cutting system 100 described above). The routine 700 then proceeds to block 702, wherein a first sensor is used to monitor a first performance characteristic of a component of the liquid jet cutting system. For example, as described above, an accelerometer can be used to monitor movement of the cutting head assembly of the liquid jet cutting system. The first sensor can generate data associated with the monitored first performance characteristic, as indicated in block 704. This data can be sent to a computing device or another component of the liquid jet cutting system.

The routine 700 can proceed to block 706, wherein a second sensor is used to monitor a second performance characteristic of a component of the liquid jet cutting system. In some embodiments, the second sensor is of a different type from the first sensor. For example, the second sensor can be a microphone or other audio sensor, a thermistor other temperature sensor, a pressure sensor, or some other sensor used to monitor a second characteristic of the component. In some embodiments, the second sensor monitors a second performance characteristic of a second component separate from the component monitored by the first sensor. As described above with respect to FIGS. 4B and 5B, the second sensor can be a microphone configured to monitor sound generated by the cutting head assembly. As indicated in block 708 the second sensor can generate data associated with the monitored second performance characteristic. This data can be sent to the computing device or to another component of the liquid jet cutting system.

Data from the first sensor can be correlated to data from the second sensor to compare the data of the first performance characteristic to the data of the second performance characteristic, as indicated in block 710. If data from both sensors indicates a failure (e.g., data from the two sensors indicates contemporaneous abnormal first and second performance characteristics), the computing device can be configured to shut off the liquid jet. If, on the other hand, only one of the two sensors indicates a failure, the computing device can be configured to alert the user to a possible failure without automatically shutting off the liquid jet.

Some examples of the disclosed technology are further described below.

Example 1. An operational monitoring system for use with a liquid jet cutting system, the operational monitoring system comprising: an accelerometer coupled to a cutting head of the liquid jet cutting system and configured to generate motion data associated with movement of the cutting head; and a computing device operably connected to the accelerometer and having a memory and a processor; wherein: the memory stores a planned data set including expected parameters associated with movement of the cutting head along a planned cut path; and the computing device configured to receive the motion data from the accelerometer and correlate the motion data to the planned data set.

Example 2. The operational monitoring system of claim 1 wherein the liquid jet cutting system is a water jet cutting system.

Example 3. The operational monitoring system of claim 1 wherein the accelerometer is positioned adjacent an abrasive feed line in the cutting head, and wherein the accelerometer is configured to generate motion data associated with flow of abrasive through the abrasive feed line.

Example 4. The operational monitoring system of claim 1 wherein the accelerometer is mounted on a circuit board within the cutting head.

Example 5. The operational monitoring system of claim 1 wherein the motion data includes orientation of the cutting head.

Example 6. The operational monitoring system of claim 5 wherein the computing device is configured to generate an alarm signal when the orientation of the cutting head, as indicated by the accelerometer, is different from a planned orientation of the cutting head in the planned data set.

Example 7. The operational monitoring system of claim 1 wherein the computing device is configured to generate an alarm signal when a magnitude of the motion data generated by the accelerometer exceeds a threshold value.

Example 8. The operational monitoring system of claim 1 wherein the computing device is configured to filter the motion data generated by the accelerometer by at least one frequency value.

Example 9. The operational monitoring system of claim 1, further comprising a sensor operably connected to the computing device and configured to generate sensor data corresponding to one or more characteristics of the liquid jet cutting system.

Example 10. The operational monitoring system of claim 9 wherein the sensor includes a second accelerometer, an audio sensor, a temperature sensor, a pressure sensor, an electrostatic sensor, a continuity sensor, a micro-electromechanical system, and/or an impact switch.

Example 11. The operational monitoring system of claim 9 wherein the sensor is a temperature sensor connected to the cutting head and configured to monitor a temperature of one or more portions of the cutting head.

Example 12. The operational monitoring system of claim 11 wherein the temperature sensor is configured to monitor a temperature of a nozzle of the cutting head.

Example 13. The operational monitoring system of claim 9 wherein the computing device is configured to generate an alarm signal if both the motion data and the sensor data indicate deviations from the planned data set greater than a threshold value.

Example 14. The operational monitoring system of claim 9 wherein the computing device is configured to filter out portions of the motion data and/or of the sensor data associated with ambient conditions.

Example 15. The operational monitoring system of claim 9 wherein the computing device is configured to filter out baseline vibration of the cutting head associated with powering the liquid jet cutting system.

Example 16. The operational monitoring system of claim 9 wherein one or both of the accelerometer and the sensor are embedded in an electrical cable of the liquid jet cutting system.

Example 17. The operational monitoring system of claim 1 wherein the accelerometer is connected to the cutting head using a magnet.

Example 18. The operational monitoring system of claim 1 wherein the computing device is configured to generate an alarm signal when the motion data indicates one or more components are vibrating at their respective resonant frequencies.

Example 19. An operational monitoring system for use with a liquid jet cutting system, the operational monitoring system comprising: an accelerometer coupled to a component of the liquid jet cutting system and configured to generate motion data associated with movement of the component of the liquid jet cutting system; a sensor configured to generate sensor data corresponding to one or more characteristics of the liquid jet cutting system; and a computing device operably connected to the accelerometer and to the sensor, the computing device having a memory and a processor and being configured to: receive the motion data and the sensor data; and determine whether: the motion data indicates a first performance characteristic; and the sensor data indicates a second performance characteristic.

Example 20. The operational monitoring system of claim 19 wherein the first performance characteristic is an acceleration of the component greater than a threshold movement value.

Example 21. The operational monitoring system of claim 20 wherein the first performance characteristic indicates contact between a cutting head of the liquid jet cutting system and a workpiece.

Example 22. The operational monitoring system of claim 21 wherein the first performance characteristic indicates scraping of the cutting head along a surface of the workpiece.

Example 23. The operational monitoring system of claim 21 wherein the first performance characteristic indicates impact of the cutting head with a tipped-up part of the workpiece.

Example 24. The operational monitoring system of claim 19 wherein the second performance characteristic is a sound having a magnitude greater than a threshold sound value, a temperature greater than a threshold temperature value, a pressure within a component outside of a threshold pressure range, an acceleration or deceleration of a component of the liquid jet cutting system greater than a second threshold movement value, and/or an impact having a magnitude greater than a threshold impact value.

Example 25. The operational monitoring system of claim 19 wherein the computing device is configured to shut off the liquid jet cutting system if the motion data indicates the first performance characteristic and the sensor data indicates the second performance characteristic.

Example 26. The operational monitoring system of claim 19 wherein the first performance characteristic is an acceleration of the accelerometer in a first direction greater than a threshold acceleration value.

Example 27. The operational monitoring system of claim 26 wherein the first direction is parallel to a longitudinal axis of a cutting head of the liquid jet cutting system.

Example 28. The operational monitoring system of claim 26 wherein the first direction is perpendicular to a longitudinal axis of a cutting head of the liquid jet cutting system.

Example 29. The operational monitoring system of claim 19 wherein the accelerometer is coupled to a cutting head of the liquid jet cutting system and the sensor is a second accelerometer coupled to an actuator of the liquid jet cutting system upstream of the cutting head.

Example 30. A method of monitoring operation of a liquid jet cutting system, the method comprising: monitoring acceleration of a cutting head of the liquid jet cutting system using an accelerometer; generating motion data indicating acceleration of the cutting head; receiving the motion data from the accelerometer at a computing device having a memory and a processor; correlating, using the computing device, the motion data with planned data, wherein the planned data reflects normal operating motions and/or operating conditions associated with a planned cut; indicating a condition of the liquid jet cutting system based on one or more correlations between the motion data and the planned data.

Example 31. The method of claim 30, further comprising generating an alarm signal, via the computing device, if the condition of the liquid jet cutting system indicates wear on a component of the liquid jet cutting system beyond an acceptable wear value.

Example 32. The method of claim 30, further comprising generating an alarm signal, via the computing device, if the motion data indicates an acceleration of the cutting head greater than an acceptable acceleration value.

Example 33. The method of claim 30 wherein the liquid jet cutting system is a water jet cutting system.

Example 34. The method of claim 30 wherein the accelerometer is configured to monitor abrasive flow through an abrasive feed line in the cutting head.

Example 35. The method of claim 30 wherein the accelerometer is mounted on a circuit board within the cutting head.

Example 36. The method of claim 30 wherein the accelerometer is integrated into a cable of the liquid jet cutting system.

Example 37. The method of claim 30, further comprising correlating motion data with known resonant frequencies of one or more components of the liquid jet cutting system.

Example 38. The method of claim 37, further comprising generating an alarm signal if the motion data indicates that one or more components are vibrating at resonant frequencies.

Example 39. A method of monitoring operation of a liquid jet cutting system, the method comprising: monitoring acceleration of a component of the liquid jet cutting system using an accelerometer; generating motion data, using the accelerometer, indicating acceleration of the component; monitoring one or more characteristics of one or more components of the liquid jet cutting system using a sensor; generating characteristic data, using the sensor, indicating the one or characteristics of the one or more components of the liquid jet cutting system; receiving, at a computing device having a memory and a processor, the motion data from the accelerometer and the characteristic data from the sensor; correlating, using the computing device, the motion data with the characteristic data; determining a failure within the liquid jet cutting system via the correlation between the motion data and the characteristic data.

Example 40. The method of claim 39 wherein the accelerometer is a first accelerometer and the sensor is a second accelerometer.

Example 41. The method of claim 40 wherein the second accelerometer is positioned on a portion of a pump of the liquid jet cutting system and the method further includes monitoring vibration of one or more components of the pump.

Example 42. The method of claim 39 wherein the accelerometer is integrated into a cable of the liquid jet cutting system.

Example 43. The method of claim 39 wherein the sensor a second accelerometer, an audio sensor, a temperature sensor, an electrostatic sensor, a continuity sensor, a microelectromechanical system, and/or an impact switch.

4 Example 4. The method of claim 39 wherein the one or more characteristics include acceleration, noise, and/or temperature.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

As one of ordinary skill in the art will appreciate, embodiments of the operational monitoring systems described herein can reduce the need for operator involvement and can provide faster and more reliable detection of faults, failures, or other adverse phenomena within a liquid jet cutting system. Such advantages can be achieved, for example, by automating the detection of anomalous performance characteristics of one or more components of liquid jet cutting system. Rather than relying on operator's unique experience and/or expertise to determine anomalies in the liquid jet cutting system, sensors can be used to precisely and objectively monitor performance characteristics of components of the system and compare those performance characteristics to predetermined "normal" or "acceptable" (e.g., planned) characteristic values, and/or to other characteristics monitored by other sensors in the system.

Other advantages of embodiments of the systems, devices and methods described herein to monitor operation of the liquid jet cutting system include: increased life of components of the liquid jet cutting system (e.g., via quick shutdown of the liquid jet cutting system during a failure); reduction in waste associated with scrapped workpieces damaged by faulty liquid jet cutting systems; reduction in determination of false positives (e.g., more assurance that the detected failures are genuine).

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. The teachings of the present disclosure provided herein can be applied to other systems, not necessarily the system described above. The elements and acts of the various embodiments described above can be combined to provide further embodiments. All of the patents and applications and other references identified herein, including any that may be listed in accompanying filing papers, are incorporated herein by reference. Aspects of the present disclosure can be modified, if necessary, to employ the systems, functions, and concepts of the various references described above to provide yet further embodiments of the present disclosure.

In general, the terms used in the following claims should not be construed to limit the present disclosure to the specific embodiments disclosed in the specification, unless the above Detailed Description section explicitly defines such terms. Accordingly, the actual scope of the present disclosure encompasses not only the disclosed embodiments, but also all equivalent ways of practicing or implementing the present disclosure.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims. Moreover, although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method of monitoring operation of a liquid jet cutting system with a computing device, the method comprising:
   receiving motion data at the computing device, wherein the motion data is generated by an accelerometer and indicates movement of a cutting head of the liquid jet cutting system;
   comparing the motion data to planned data, wherein the planned data reflects normal operating motions and/or normal operating conditions associated with a planned cut; and
   indicating a condition of the liquid jet cutting system based at least in part on the comparison of the motion data to the planned data.

2. The method of claim 1, further comprising generating an alarm signal, via the computing device, if the condition of the liquid jet cutting system indicates wear on a component of the liquid jet cutting system beyond an acceptable wear value.

3. The method of claim 1, further comprising generating an alarm signal, via the computing device, if the motion data indicates an acceleration of the cutting head is greater than an acceptable acceleration value.

4. The method of claim 1 wherein the liquid jet cutting system is a water jet cutting system.

5. The method of claim 1 wherein the accelerometer is configured to monitor abrasive flow through an abrasive feed line in the cutting head.

6. The method of claim 1 wherein the accelerometer is mounted on a circuit board within the cutting head.

7. The method of claim 1 wherein the accelerometer is integrated into a cable of the liquid jet cutting system.

8. The method of claim 1, further comprising comparing the motion data to one or more known resonant frequencies of the cutting head and/or one or more other components of the liquid jet cutting system.

9. The method of claim 8, further comprising generating an alarm signal when the motion data indicates that the cutting head and/or the one or more other components are vibrating at their respective resonant frequencies.

10. The method of claim 1 wherein indicating the condition includes indicating, based at least in part on the comparison, contact between the cutting head and a workpiece.

11. The method of claim 1 wherein—
the motion data includes an acceleration of the cutting head,
the planned data includes a maximum planned acceleration and a planned cut path, and
indicating the condition includes indicating when the acceleration is less than the maximum planned acceleration but the movement of the cutting head deviates from the planned cut path for a predetermined period of time.

12. The method of claim 1 wherein indicating the condition includes indicating that the cutting head has completed the planned cut.

13. A method of monitoring operation of a liquid jet cutting system with a computing device, the method comprising:
receiving motion data and characteristic data, wherein the motion data is received from an accelerometer and is associated with movement of a component of the liquid jet cutting system, and wherein the characteristic data is received from a sensor and is associated with one or more performance characteristics of the liquid jet cutting system;
comparing the motion data to the characteristic data; and
determining whether a failure has occurred within the liquid jet cutting system based at least in part on the comparison of the motion data to the characteristic data.

14. The method of claim 13 wherein the accelerometer is a first accelerometer and the sensor is a second accelerometer.

15. The method of claim 14 wherein the second accelerometer is positioned on a portion of a pump of the liquid jet cutting system and the characteristic data includes vibration data associated with one or more components of the pump.

16. The method of claim 13 wherein the accelerometer is integrated into a cable of the liquid jet cutting system.

17. The method of claim 13 wherein the sensor includes another accelerometer, an audio sensor, a temperature sensor, an electrostatic sensor, a continuity sensor, a microelectromechanical system, and/or an impact switch.

18. The method of claim 13 wherein the one or more performance characteristics include acceleration, noise, and/or temperature.

19. The method of claim 13 wherein comparing the motion data to the characteristic data includes—
comparing the motion data to one or more expected parameters associated with the movement of the component to determine whether the motion data indicates a first performance characteristic associated with the failure,
comparing the characteristic data to one or more expected performance characteristics associated with a liquid jet of the liquid jet cutting system but unassociated with the movement of the component to determine whether the characteristic data indicates a second performance characteristic associated with the failure, and
comparing the first performance characteristic to the second performance characteristic.

20. The method of claim 13 wherein comparing the motion data to the characteristic data includes—
determining that, during a time range, the motion data was equal to or greater than a motion data threshold; and
determining that, during at least a portion of the time range, the characteristic data was equal to or greater than a characteristic data threshold.

* * * * *